Feb. 28, 1939. G. C. DEAKINS 2,148,850
MUD PUMP VALVE
Filed Dec. 19, 1931 2 Sheets-Sheet 1
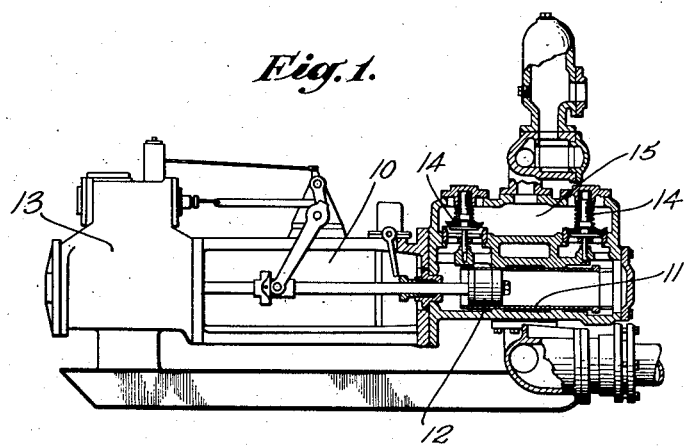
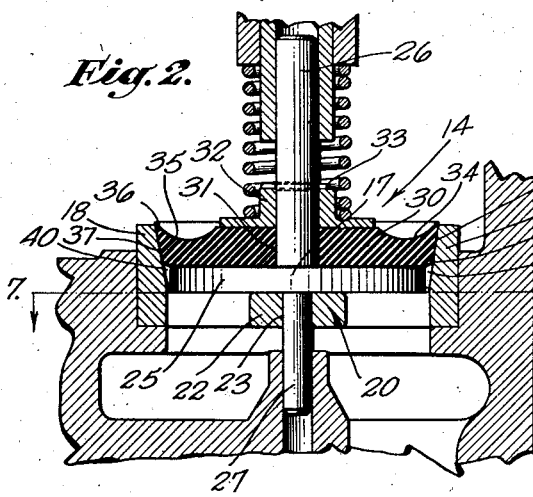
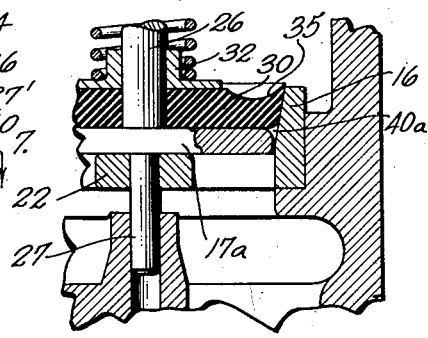
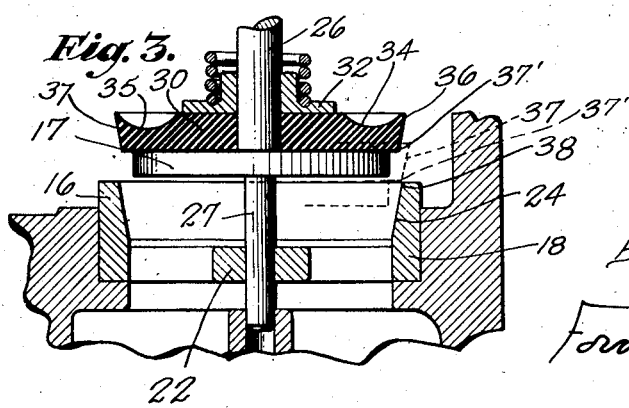
INVENTOR:
GROVER C. DEAKINS,
BY
Ford W Davis
ATTORNEY.

Feb. 28, 1939.　　　G. C. DEAKINS　　　2,148,850
MUD PUMP VALVE
Filed Dec. 19, 1931　　　2 Sheets-Sheet 2
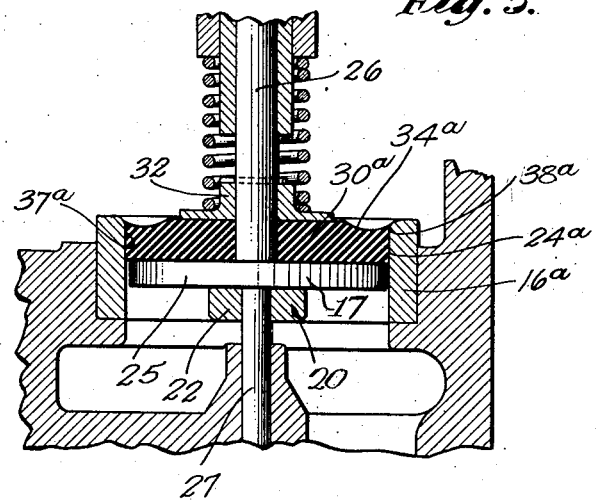
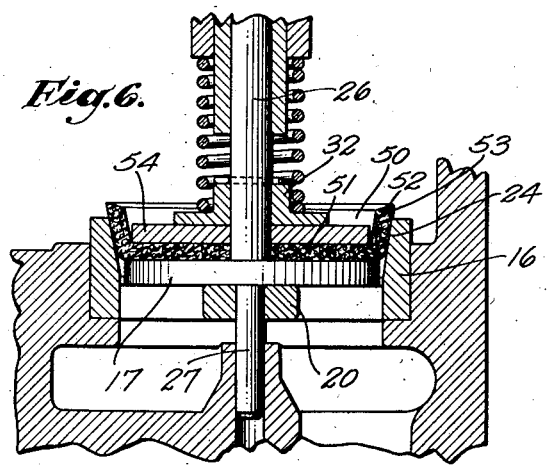
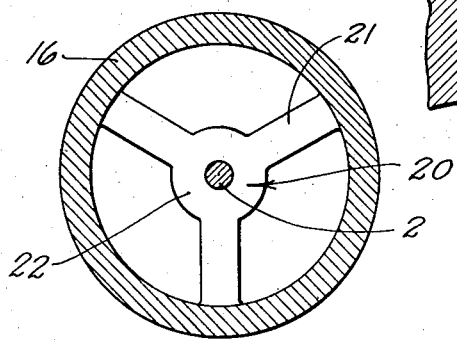
INVENTOR:
GROVER C. DEAKINS,
BY
ATTORNEY.

Patented Feb. 28, 1939

2,148,850

UNITED STATES PATENT OFFICE 2,148,850

MUD PUMP VALVE

Grover C. Deakins, Anaheim, Calif., assignor, by mesne assignments, to MacClatchie Manufacturing Company of California, Compton, Calif., a corporation of California Application December 19, 1931, Serial No. 582,046

17 Claims. (Cl. 251—144)

My invention relates to valves of the character employed in mud pumps or other pumps adapted to pump fluid mixtures containing abrasive materials, and relates particularly to an improved form of such valve capable of longer periods of uninterrupted use than valves which are at present employed in pumps of this character.

Mud pump valves of the character to which my invention relates are subject to very rapid wear owing to the presence of abrasive materials, such as fine particles of rocks, quartz, or sand contained in the drilling fluid or mud, and therefore must be replaced after comparatively short periods of use. Such valves ordinarily include a seat member consisting of an annular ring with a sealing seat near the upper end thereof and a spider structure across the lower portion thereof, and a valve element including a body of metal adapted to strike against the spider when the valve element is in lowered or relatively closed position and a sealing member on the metal body adapted to engage the sealing face of the seat member and prevent leakage of fluid through the valve when the valve is in its closed position.

It is an object of my invention to provide a valve of the above character of simple construction yet being capable of giving a greater period of service than valves of complex structure.

It is an object of the invention to provide a valve having a seat member including an annular sealing face or seat and a valve closure member having a circular or annular sealing member of rubber material adapted to enter the space enclosed by the annular sealing seat or face of the seat member and to be deformed by fluid pressure so as to expand against the sealing face of the seat member.

It is a further object of the invention to provide a valve of the above character in which the cooperative parts are so formed that the sealing member preferably wipes the sealing face clean as it moves into closed position, thereby reducing to a minimum the particles of abrasive material which may rest between the sealing member and the sealing face, the result thereof being that the wear between these parts is minimized and the useful life of the valve materially extended.

It is a further object of the invention to provide a valve which may be used for abrasive substances and which may be also employed in pumps for circulating other fluids, such as crude oils.

It is a still further object of the invention to seal the valve by a sealing member on the valve body having a peripheral annular engagement surface adapted to be received within an annular inwardly faced sealing wall surface of the valve seat, whereby the engagement surface is adapted to be deformed radially outwardly for sealing engagement with the sealing wall surface, the seating movement of the valve body being limited by its engagement with a supporting surface of the seat member, and said supporting surface being at an angle to the direction of opening and closing movement of the valve appreciably greater than the angle of the sealing surface with relation to the direction of opening and closing movement of the valve. The supporting surface thus takes the blow and relieves the sealing member of excessive wear as the valve closes, and by its appreciable angle to the axis of the valve prevents radial distortion of the seat member or swedging action such as might deform the seat or the valve body, while the smaller angle of the sealing surface with relation to the axis of the valve, insures a tight sealing engagement by radially deforming and confining the sealing member within the inwardly faced annular sealing wall surface, rather than by merely pressing the sealing member against a cooperating surface lying at an appreciable angle to the axis of the valve.

Further objects and advantages of the invention will be made evident throughout the following part of the specification.

Referring to the drawings, which are for illustrative purposes only,

Fig. 1 is a partly sectioned elevational view showing a mud pump equipped with valves embodying my invention.

Fig. 2 is an enlarged fragmentary cross section showing one of the valves in closed position.

Fig. 3 is an enlarged fragmentary sectional view similar to Fig. 2 showing the valve in relatively open position.

Fig. 4 is a fragmentary sectional view showing an alternative manner in which clearance may be provided within the periphery of the sealing member of the valve.

Fig. 5 is a fragmentary sectional view showing an alternative form of the invention which is also suitable for pumping abrasive materials.

Fig. 6 is a fragmentary sectional view showing a form of my invention adapted for use in other types of pumps, such as oil pumps.

Fig. 7 is a section on a plane represented by the line 7—7 of Fig. 2.

In Fig. 1 I show a reciprocating pump 10 having a pumping cylinder 11 in which a piston 12 is reciprocated by a steam powered engine 13. The rightward portion of the pump 10 is sectioned so as to show discharge valves 14 which are connected with the opposite ends of the cylinder 11 so that as the piston 12 is reciprocated, fluid will be forced upwardly from the respective ends of the cylinder into an outlet chamber 15 which in mud pumps is connected through a rotary hose to the rotary drilling string.

As shown in Fig. 2, the preferred embodiment of my improved valve 14 includes a seat member 16 and a valve body or closure member 17 which moves relative to the seat member 16. The seat member 16 includes an annular wall 18 and a support or spider 20 which extends across the lower portion of the annular wall 18, this spider 20 comprising a number of radial arms 21 extending inwardly from the annular wall 18 and a central hub 22 having an axial opening 23 therein. Above the spider 20 the annular wall 18 is formed with an annular sealing surface 24. This sealing surface is shown as preferably flaring outwardly and upwardly at a comparatively steep angle; or the sealing surface may have no taper but be cylindrical as will be later described with reference to Fig. 5, it being the steep angle of the sealing surface that greatly contributes to the improved operation and wear resisting qualities of my new valve. The valve body 17 is in the form of a metal enlargement 25 having a lower abutment area which includes abutment surfaces adjacent both the axis and the periphery of said enlargement and adapted, when the valve is closed, to engage the upper face of the hub 22 and the radial arms 21 which constitute the spider. The abutment surface of the enlargement 25 which is adjacent the periphery thereof engages the abutment formed by the arms 21 adjacent and extending inwardly from the annular wall 18, and the abutment surface of the enlargement 25 which is adjacent the axis thereof engages the abutment formed by the hub 22 adjacent the axis of the valve. The enlargement is equipped with guide means in the form of upwardly and downwardly projecting axial stems 26 and 27 of the character commonly employed in mud pump valves. On the upper face of the body 17 is a sealing member 30 consisting essentially of a flat disc of yieldable material, such as rubber or rubber compound, having an opening 31 therein through which the stem 26 projects, the sealing member 30 being held in place on the body 17 by a flange member 32 which is held down against the upper face of the sealing member 30 by means of a pin 33 extended through the stem 26. The sealing member 30 is of such external diameter that it will enter the space enclosed by the surface 24 as the closure member 17 moves from the open position in which it is shown in Fig. 3 to the closed position in which it is shown in Fig. 2. As the member 17 moves to closed position fluid pressure within the chamber 15 is exerted downwardly against the annular upwardly directed surface 34 of the sealing member 30 exposed around the flange 32, such pressure compressing the rubber or yieldable material of the peripheral portion of the sealing member 30 against the upper face of the body 17 and causing the periphery of the sealing member 30 to be expanded or deformed radially outwardly so as to be confined within and radially contact the surrounding annular wall surface 24. The sealing member 30 is shown with a shallow peripheral groove 35 so as to form the semblance of a lip 36, but for some uses satisfactory results may be obtained where the upper face of the sealing member 30 is left flat.

A feature of the invention is to make the diameter of the sealing member 30 of such measure relative to the diameter of the sealing surface 24 that not later than when the body 17 engages the spider 20 the fluid pressure in the chamber 15 will have caused the peripheral face 37 of the sealing member to engage the sealing surface 24, with the peripheral face 37 sealing against the sealing surface 24 when the valve is closed.

Another feature of the invention which may be employed, is to make the diameter of the sealing member 30 of such measure relative to the diameter of the sealing surface 24 that the fluid pressure in the chamber 15 will cause the peripheral face 37 of the sealing member to make wiping contact with the surface 24 as the closure member 17 moves toward closed position. The sealing member 30 may be of such size that when the body 17, during its downward movement, reaches the position indicated by the dotted lines in Fig. 3, the fluid pressure in the chamber 15 will cause the lower edge of the peripheral face 37 of the sealing member 30 to engage the upper edge of the wall surface 24. As the closure member 14 then continues downwardly toward fully closed position, such as shown in Fig. 2, the surfaces 24 and 37 wipe across one another and remove from each other much of the collected material. It may be that fine abrasive materials will remain on the surfaces 24 and 37, but the condition of the valve after it has been in use for a considerable period of time indicates that this wiping action at least removes the larger particles of material which would prevent a sealing action between the periphery of the sealing member 30 and the wall surface 24. For illustration, as the closure member 17 moves to closed position, the lower peripheral corner 37' of the sealing member may wipe materials from the wall surface 24, and the upper annular corner 38 of the wall surface 24 may wipe materials from the face 37 of the sealing member 30, leaving these surfaces in such condition that a practical seal will result. For example, the seal formed is of such practical efficiency that I have been able to employ a single valve structure continuously for a period of over ninety days, replacing the sealing member but once during this period. At the time of signing this application this valve is still in use with the second rubber or sealing member 30.

Another feature of the invention is to yieldably urge the sealing member 30 into sealing engagement with wall surface 24, so that the sealing member may accommodate itself to wear of the metal parts of the valve structure without excessive wear of the resilient sealing member. For this purpose the flange member 32 is of such restricted diameter that the enlargement 25 as well as the sealing member 30 project appreciably radially beyond the flange member. An appreciable area of the upper surface of the sealing member is thus exposed to the fluid pressure in chamber 15 for tightly seating the sealing member against wall surface 24, and in the event of the metal parts of the assembly being excessively worn so that the sealing member 30 is forced further down into the annular seat 24 before tightly closing the valve, the restricted diameter of the flange member 32 permits such flexing of the outer peripheral portion of the sealing member 30 as will readily adapt it to its new seating position, with said flexing of the outer peripheral portion of the sealing member avoiding cutting through and destruction of the sealing member.

A further feature of my new construction is that the parts are so formed as to provide an annular space 40 within or below the peripheral edge 37' of the sealing member in which material dislodged from the surface 24 as the valve body moves into closed position may collect. As shown in Fig. 2, the space 40 is a continuous annular space formed by reducing the diameter of the body 17 immediately below the sealing member 30. In Fig. 4 I show a space 40a having the same purpose which is formed by chamfering the upper peripheral edge of a body 17a which closely fits the lower portion of the wall surface 24.

In Fig. 5 I show a form of my invention which is exactly the same as the valve shown in Figs. 2 and 3 with the exception that the sealing face or inwardly directed wall surface 24a is cylindrical for a greater part of its length and is slightly chamfered at the corner 38a. Corresponding to the surface 24a, the peripheral surface 37a of the sealing member 30a is cylindrical and may be of such diameter that responsive to fluid pressure, wiping engagement between the surfaces 24a and 37a will be accomplished as the closure member 17a moves into the closed position shown in Fig. 5, it being understood that upon reaching such closed position, fluid pressure against the sealing member causes radial expansion of its annular face 34a into tight sealing engagement with the surface 24a.

In Fig. 5 the wall surface 24a is shown cylindrical for a portion of its length and slightly flared at its upper end. In Figs. 2, 3, and 4, the wall surface 24 is shown comparatively steeply upwardly flared for the purpose of self-adjustment of the parts as the upper face of the support or spider wears down due to the repeated hammering of the body 17 thereagainst during the operation of the pump. Accordingly, in the preferred practice of my invention the wall surface 24 may have such a comparatively steep angle that the annular peripheral engagement surface of the sealing member is adapted to be radially expanded and confined within the annular wall surface 24, and moves relative to surface 24 in the direction of closing movement of the valve so as to permit ready dislodgement of abrasives rather than trapping the same between the surfaces 24—37; and the wall 24 may be flared at such a steep angle as to compensate for the wear between the surfaces 24 and 37 and between the bottom of the body 17 and the upper face of the support 20. As the stopping position of the body 17 moves downwardly as the result of the last named wear, the sealing member, which has worn slightly, assumes a stopping position relative to a lower portion of the wall surface 24 of slightly reduced diameter.

In Fig. 6 I show an alternative form of my valve having a seat member 16 of a form identical with the illustration thereof in Figs. 2, 3, and 4. In this form of the invention, however, the sealing member 30 is replaced by a dished or cup-shaped sealing member 50 having a circular wall 51 and an upturned, slightly upwardly flared lip or wall 52 which provides an outer surface 53 adapted to enter the annular wall surface 24 and to be forced outwardly by fluid pressure against the upper and inner faces of the lip 52. The sealing member 50 may be made of leather and may be held in place on the body 17 by use of a flat metal disc 54 of a size to fit under the holddown flange 32. This alternative form of my invention is especially designed for use in high pressure oil pumps or high pressure pumps for transferring other liquids. The same wiping action between the surfaces 24 and 53 of the members 16 and 50 may be accomplished, and the pounding effect due to the high pressure on the upper face of the movable valve part is received by the spider or support 20.

Another feature of the invention is that the supporting of the seat member which takes the blow when the valve closes, is at an appreciable angle to the direction of opening and closing movement of the valve, while the sealing engagement between surfaces 24—37 is at a slight angle to the direction of opening and closing movement. For example, as shown at Fig. 2, the surface 24 flares upwardly and radially outwardly at a steep angle, and the engagement surface 37 of the sealing member flares upwardly and radially outwardly at substantially the same steep angle; while the upper surface of spider 20 which provides the abutment surface which takes the blow when the valve closes, is at an angle which is not nearly as steep.

Consequently the hammering blow of the closing valve is directed against the cooperating support of the seat member, at an angle which is at least a near approach to a right angle, so as to avoid swedging action or radial distortion of the seat member; and the sealing engagement at surfaces 24—37 is in a plane which is either parallel or close to parallel to the direction of movement of the valve, whereby material will readily dislodge from between the surfaces 24—37, and the sealing engagement is made by radially outwardly deforming and confirming the sealing member within the annular wall 24. The arresting abutment and the sealing engagement at different angles to the axis of the valve, with the arresting abutment at the greater angle, thus cooperate to define a construction wherein the valve is seated without undue wear of the sealing member and without distortion of either the valve seat or the valve body, and with foreign material dislodged from between the body and seat, and the sealing engagement resulting from radial expansion and confinement of the sealing member within an annular sealing wall of the valve seat.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A valve of the character described, including: a seat member comprising an annular wall of short tubular form and a support consisting of an open-work structure extending across one end of said annular wall, the other end of said annular wall providing an outwardly flared, inwardly faced sealing wall surface; a valve body adapted to move to and from said support, said valve body comprising a guide means and an enlargement adapted to engage said support; and an annular sealing member on the upper face of said enlargement having an outwardly flared resilient peripheral portion providing an annular engagement surface adapted to engage said wall surface as said valve body moves into engagement with said support and being of such diameter relative to said wall surface as to engage said wall surface at a point before said enlargement engages said support and to have a wiping movement relative to said wall surface as said enlargement moves from said point into engagement with said support, there being a space below said annular engagement surface to receive the wipings removed from said wall surface by said annular engagement surface, and the peripheral portion of the upper face of said sealing member being exposed to fluid pressure whereby such fluid pressure may deform the periphery of said sealing member outwardly to increase the pressure of the sealing engagement of said sealing member with said wall surface.

2. A valve of the character described, including: a seat member comprising an annular wall of short tubular form and a support consisting of an open-work structure extending across one end of said annular wall, the other end of said annular wall providing an outwardly flared, inwardly faced sealing wall surface; a valve body adapted to move to and from said support, said valve body comprising a guide means and an enlargement adapted to engage said support; and an annular sealing member on the upper face of said enlargement having an outwardly flared resilient peripheral portion providing an annular engagement surface adapted to engage said wall surface as said valve body moves into engagement with said support and being of such diameter relative to said wall surface as to engage said wall surface at a point before said enlargement engages said support and to have a wiping movement relative to said wall surface as said enlargement moves from said point into engagement with said support.

3. A valve of the character described including: a seat member comprising an annular wall and a support below the upper end of the annular wall, the upper end of the annular wall providing an outwardly flaring annular sealing surface; a valve body adapted to move to and from the support, said valve body comprising a guide means and an enlargement adapted to engage the support; and an annular sealing member on the upper face of said enlargement having a resilient peripheral portion providing an annular engagement surface adapted to engage said annular sealing surface as the valve body moves into engagement with the support and being of such diameter relative to the annular sealing surface as to engage said annular sealing surface at a point before said enlargement engages the support and to have wiping movement relative to the annular sealing surface as said enlargement moves from said point into engagement with the support, there being a space below the annular engagement surface of sufficient size to receive materials wiped from the annular sealing surface by the sealing member as said sealing member moves into closed position relative to the seat member.

4. A valve of the character described including: a seat member comprising an annular wall and a support below the upper end of the annular wall, the upper end of the annular wall providing an outwardly flaring annular sealing surface; a valve body adapted to move to and from the support; and an annular sealing member on the upper face of the body having an outwardly flared resilient peripheral portion providing an annular engagement surface adapted to engage said annular sealing surface as the valve body moves into engagement with the support and being of such diameter relative to the annular sealing surface as to engage said annular sealing surface at a point before the body engages the support and to have wiping movement relative to the annular sealing surface as the body moves from said point into engagement with the support, the peripheral portion of the upper face of the sealing member being exposed to fluid pressure whereby such fluid pressure may deform the periphery of the sealing member to increase the pressure of the sealing engagement of the sealing member with the annular sealing surface.

5. A valve of the character described, including: a seat member comprising an annular wall and a support below the upper end of the annular wall, the upper end of the annular wall providing an outwardly flaring annular sealing surface; a valve body adapted to move to and from the support; an annular sealing member on the upper face of the body having a resilient peripheral portion providing an annular engagement surface adapted to engage said annular sealing surface as the valve body moves into engagement with the support and being of such diameter relative to the annular sealing surface as to engage said annular sealing surface at a point before the body engages the support and to have wiping movement relative to the annular sealing surface as the body moves from said point into engagement with the support; and a retaining member overlying the sealing member and of a diameter whereby the sealing member and the valve body project radially beyond the retaining member, so that the peripheral portion of the sealing member may be flexed to accommodate it to the annular sealing surface and the upper face of said peripheral portion of the sealing member is exposed to fluid pressure whereby such fluid pressure may deform the periphery of the sealing member to increase the pressure of the sealing engagement of the sealing member with the annular sealing surface.

6. In a valve; a seat member comprising an annular wall and an abutment surface below the upper end of and in the bore defined by the annular wall, the abutment surface being adjacent the axis of the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; and an annular sealing member on the valve body having a resilient peripheral portion providing a peripheral engagement surface normally flaring at substantially the same angle as that of the annular sealing surface and of such diameter as to engage said annular sealing surface before the valve body engages the abutment surface, the peripheral portion of the sealing member being exposed to fluid pressure for deforming its flaring peripheral engagement surface for sealing contact with the annular sealing surface.

7. In a valve; a seat member comprising an annular wall and an abutment surface below the upper end of and in the bore defined by the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; and an annular sealing member on the valve body having a resilient peripheral portion providing a peripheral engagement surface normally flaring at substantially the same angle as that of the annular sealing surface, said peripheral portion of the sealing member being of such diameter and exposed to fluid pressure so that its flaring peripheral engagement surface engages the annular sealing surface before the valve body engages the abutment surface, and seals against the annular sealing surface when the valve is closed.

8. In a valve; a seat member comprising an annular wall and an abutment surface below the upper end of and in the bore defined by the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; and an annular sealing member on the valve body having a resilient peripheral portion providing a peripheral engagement surface normally flaring at substantially the same angle as that of the annular sealing surface, said peripheral portion of the sealing member being of such diameter and exposed to fluid pressure so that its flaring peripheral engagement surface engages the annular sealing surface before the valve body engages the abutment surface, and seals against the annular sealing surface when the valve is closed; and there being space below said flaring peripheral engagement surface when the valve is closed, adapted to receive material dislodged from the annular sealing surface.

9. In combination; a valve body adapted to move to and from a cooperating annular valve seat parallel to the axis of the valve body; and an annular sealing member on the valve body having a resilient peripheral portion providing a peripheral engagement surface normally flaring upwardly and outwardly, the valve body having an abutment surface adapted to engage the valve seat, said abutment surface being at an angle to the axis of the valve body appreciably greater than the angle of said flaring peripheral engagement surface to said axis, the flaring peripheral engagement surface being of such diameter as to engage the valve seat before the abutment surface of the valve body engages the valve seat, and the peripheral portion of the sealing member being exposed to fluid pressure for deforming its flaring peripheral engagement surface for sealing contact with the valve seat.

10. In combination; a valve body adapted to move to and from a cooperating annular valve seat parallel to the axis of the valve body; and an annular sealing member on the upper face of the valve body having a resilient peripheral portion including an upstanding lip providing a peripheral engagement surface normally flaring upwardly and outwardly, the valve body having abutment surfaces adjacent both the periphery and the axis thereof adapted to engage the valve seat, said abutment surface being at angles to the axis of the valve body appreciably greater than the angle of said flaring peripheral engagement surface to said axis, the flaring peripheral engagement surface being of such diameter as to engage the valve seat by the time the abutment surfaces of the valve body engage the valve seat, and the lip of the sealing member being exposed to fluid pressure for deforming the flaring peripheral engagement surface of the sealing member for sealing contact with the valve seat.

11. In combination; a valve body adapted to move to and from a cooperating annular valve seat parallel to the axis of the valve body; and an annular sealing member on the valve body having a resilient peripheral portion providing a peripheral engagement surface normally flaring upwardly and outwardly, the valve body having an abutment surface adjacent the periphery thereof adapted to engage the valve seat, said abutment surface being at an angle to the axis of the valve body appreciably greater than the angle of said flaring peripheral engagement surface to said axis, the flaring peripheral engagement surface being of such diameter as to engage the valve seat by the time the abutment surface of the valve body engages the valve seat, and the peripheral portion of the sealing member being exposed to fluid pressure for deforming its flaring peripheral engagement surface for sealing contact with the valve seat.

12. In combination; a valve body adapted to move to and from a cooperating annular valve seat parallel to the axis of the valve body; and an annular sealing member on the valve body having a resilient peripheral portion providing a peripheral engagement surface normally flaring upwardly and outwardly, the valve body having an abutment surface adjacent the axis thereof adapted to engage the valve seat, said abutment surface being at an angle to the axis of the valve body appreciably greater than the angle of said flaring peripheral engagement surface to said axis, the abutment surface being rigid throughout its area, the flaring peripheral engagement surface being of such diameter as to engage the valve seat by the time the abutment surface of the valve body engages the valve seat, and the peripheral portion of the sealing member being exposed to fluid pressure for deforming its flaring peripheral engagement surface for sealing contact with the valve seat.

13. In combination; a valve body adapted to move to and from a cooperating annular valve seat parallel to the axis of the valve body; and an annular sealing member on the valve body having a resilient peripheral portion providing a peripheral engagement surface normally flaring upwardly and outwardly, the valve body having an abutment surface adapted to engage the valve seat, said abutment surface being at an angle to the axis of the valve body appreciably greater than the angle of said flaring peripheral engagement surface to said axis, the abutment surface being rigid throughout its area, the flaring peripheral engagement surface being of such diameter as to engage the valve seat by the time the abutment surface of the valve body engages the valve seat, and the peripheral portion of the sealing member being exposed to fluid pressure for deforming its flaring peripheral engagement surface for sealing contact with the valve seat.

14. In a valve; a seat member comprising an annular wall and an abutment surface below the upper end of and in the bore defined by the annular wall, the abutment surface being adjacent the axis of the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; an annular sealing member on the upper face of the valve body having a resilient peripheral portion including an upstanding lip providing a peripheral engagement surface normally flaring at substantially the same angle as that of the annular sealing surface and of such diameter as to engage the annular sealing surface by the time the valve body engages the abutment surface; and a retaining member overlying the sealing member and of a diameter less than that of the upstanding lip whereby said lip is exposed to fluid pressure for deforming its flaring peripheral engagement surface for sealing contact with the annular sealing surface; there being space below said flaring peripheral engagement surface when the valve is closed, for reception of material dislodged from the annular sealing surface.

15. In a valve; a seat member comprising an annular wall and an abutment surface below the upper end of and in the bore defined by the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; an annular sealing member on the upper face of the valve body having a resilient peripheral portion providing a peripheral engagement surface normally flaring at substantially the same angle as that of the annular sealing surface; and a retaining member overlying the sealing member and of a diameter less than that of said peripheral portion of the sealing member, said peripheral portion of the sealing member being of such diameter and exposed to fluid pressure so that its flaring peripheral engagement surface engages the annular sealing surface by the time the valve body engages the abutment surface, and seals against the annular sealing surface when the valve is closed; the valve body and the sealing member when moved to closed position cooperating with the seat member to define a space for reception of material dislodged from the annular sealing surface.

16. In a valve; a seat member comprising an annular wall and an abutment surface below the upper end of and in the bore defined by the annular wall, the upper end of the annular wall providing an outwardly flaring annular sealing surface; a valve body adapted to move to and from the abutment surface parallel to the axis of the annular wall, the abutment surface being adapted for engagement by the valve body at an angle to the axis of the annular wall appreciably greater than the angle of the annular sealing surface to said axis; an annular sealing member on the upper face of the valve body having a resilient peripheral portion providing a peripheral engagement surface normally flaring at substantially the same angle as that of the annular sealing surface; and a retaining member overlying the sealing member and of a diameter less than that of said peripheral portion of the sealing member, said peripheral portion of the sealing member being of such diameter and exposed to fluid pressure so that its flaring peripheral engagement surface engages the annular sealing surface by the time the valve body engages the abutment surface, and seals against the annular sealing surface when the valve is closed.

17. In combination; a valve body adapted to move to and from a cooperating annular valve seat parallel to the axis of the valve body; and an annular sealing member on the valve body having a resilient peripheral portion providing a peripheral engagement surface normally flaring upwardly and outwardly, the valve body having an abutment surface adjacent the axis thereof adapted to engage the valve seat, said abutment surface being at an angle to the axis of the valve body appreciably greater than the angle of said flaring peripheral engagement surface to said axis, the flaring peripheral engagement surface being of such diameter as to engage the valve seat before the abutment surface of the valve body engages the valve seat; and there being space below said flaring peripheral engagement surface when the valve is closed, adapted to receive material dislodged from the valve seat.

GROVER C. DEAKINS.